UNITED STATES PATENT OFFICE.

WILLIAM BRISLEY AND WILLIAM STANBURY FINCH, OF TORONTO, ONTARIO, CANADA.

COMPOSITION FOR PRESERVING WOOD.

SPECIFICATION forming part of Letters Patent No. 359,384, dated March 15, 1887.

Application filed June 16, 1886. Serial No. 205,361. (No specimens.)

*To all whom it may concern:*

Be it known that we, WILLIAM BRISLEY and WILLIAM STANBURY FINCH, both subjects of the Queen of Great Britain, and both residents of Toronto, in the county of York and Province of Ontario, Canada, have invented a new and useful composition of matter to be used in the preservation of timber of all kinds, (whether hard or soft timber,) whether used as posts, rails, sleepers, railroad-ties, or for any other purpose whatever; and the following is a specification of the same.

Lime, one barrel, to be slaked to the consistency of whitewash; crude petroleum, four quarts; oil of tar, one quart; water of ammonia, one quart. If the last-named ingredient be not at hand horse or cow droppings may be used. These ingredients are to be thoroughly mingled by agitation in a tank or other suitable vessel.

In using the above-named composition the timber should be soaked or steeped in the same; or if this be not convenient, from the size of the wood or from any other cause, we lay on the composition with a brush or other suitable instrument. Either alternative should be performed so that the composition shall penetrate the wood. It thus destroys the sap and permeates the fibers, and its effect (by a trial of over ten years) is to effectually arrest wet or dry rot or other decay.

We are aware that compositions containing some of the aforesaid ingredients have been in use for a similar purpose; but we are not aware that all the ingredients of our composition have ever been used in the same proportions and for the same purpose.

What we claim, and desire to secure by Letters Patent of the United States, is—

The herein-described composition of matter to be used in the preservation of timber, consisting of slaked lime, crude petroleum, oil of tar, and water of ammonia, in the proportions specified.

WILLIAM BRISLEY.
WM. STANBURY FINCH.

Witnesses:
W. E. LAUGHTON,
RICH CADDICK.